United States Patent
Osswald et al.

(10) Patent No.: US 11,777,329 B2
(45) Date of Patent: Oct. 3, 2023

(54) METHOD FOR CONTROLLING A CHARGING OR DISCHARGING CURRENT OF A REMOVABLE BATTERY PACK AND/OR AN ELECTRICAL DEVICE AND SYSTEM FOR CARRYING OUT THE METHOD

(71) Applicant: Robert Bosch GmbH, Stuttgart (DE)

(72) Inventors: Alexander Osswald, Stuttgart (DE); Christoph Klee, Stuttgart (DE); Holger Wernerus, Pliezhausen (DE); Juergen Mack, Goeppingen (DE); Marc-Alexandre Seibert, Stuttgart (DE); Mickael Segret, Stuttgart (DE); Tim Brecht, Karlsbad (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 17/379,454

(22) Filed: Jul. 19, 2021

(65) Prior Publication Data
US 2022/0029436 A1 Jan. 27, 2022

(30) Foreign Application Priority Data
Jul. 24, 2020 (DE) ..................... 10 2020 209 400.4

(51) Int. Cl.
*H02J 7/00* (2006.01)
(52) U.S. Cl.
CPC .......... *H02J 7/0047* (2013.01); *H02J 7/0013* (2013.01); *H02J 7/0029* (2013.01)

(58) Field of Classification Search
CPC .................................................... H02J 7/0031
See application file for complete search history.

(56) References Cited

U.S. PATENT DOCUMENTS

| | | | | |
|---|---|---|---|---|
| 5,164,652 A | * | 11/1992 | Johnson | H02J 7/007182 455/226.1 |
| 5,789,902 A | * | 8/1998 | Abe | H02J 7/00306 320/136 |
| 6,118,255 A | * | 9/2000 | Nagai | H02J 7/00047 320/152 |

(Continued)

FOREIGN PATENT DOCUMENTS

| CN | 101728842 A | 6/2010 |
|---|---|---|
| DE | 10 2016 209 822 A1 | 12/2017 |

(Continued)

OTHER PUBLICATIONS

Aradate T, JP-2008067522 translation (Year: 2008).*

*Primary Examiner* — Drew A Dunn
*Assistant Examiner* — Tynese V McDaniel
(74) *Attorney, Agent, or Firm* — Maginot, Moore & Beck LLP

(57) ABSTRACT

A method controls a charging or discharging current of a removable battery pack and/or an electrical device, in particular a charging device, a diagnostic device or an electrical consumer, using a first monitoring unit integrated in the removable battery pack and a further monitoring unit integrated in the electrical device. The method includes monitoring a defined control potential of a signal or data contact between the removable battery pack and the electrical device using the further monitoring unit.

7 Claims, 2 Drawing Sheets

(56) References Cited

U.S. PATENT DOCUMENTS

| | | | | |
|---|---|---|---|---|
| 6,172,485 B1* | 1/2001 | Fujita | H02J 7/0048 | 320/136 |
| 6,577,883 B1* | 6/2003 | Ueda | H01M 10/4207 | 320/138 |
| 7,683,577 B2* | 3/2010 | Bucur | H01M 50/269 | 320/132 |
| 7,952,488 B1* | 5/2011 | Zansky | G01R 31/40 | 320/136 |
| 8,564,248 B2* | 10/2013 | Park | G06F 11/3093 | 320/134 |
| 9,570,924 B2* | 2/2017 | Endo | H01M 50/581 | |
| 2004/0189259 A1* | 9/2004 | Miura | H02J 7/0031 | 320/134 |
| 2006/0076934 A1* | 4/2006 | Ogata | H02J 7/00304 | 320/136 |
| 2007/0108941 A1* | 5/2007 | Sainomoto | H02J 7/00306 | 320/112 |
| 2009/0058365 A1* | 3/2009 | Goto | H01M 10/48 | 320/134 |
| 2009/0124299 A1* | 5/2009 | Suzuki | H02J 7/00036 | 320/153 |
| 2009/0153103 A1* | 6/2009 | Ikeuchi | H01M 10/486 | 320/152 |
| 2010/0070659 A1* | 3/2010 | Ma | G06F 13/385 | 710/14 |
| 2010/0090652 A1* | 4/2010 | Takeda | H02J 7/0031 | 320/134 |
| 2010/0196747 A1* | 8/2010 | Takeda | H02J 7/0031 | 429/61 |
| 2010/0327812 A1* | 12/2010 | Hsieh | H02J 7/007182 | 320/152 |
| 2011/0169457 A1* | 7/2011 | Mitani | H01M 10/486 | 320/134 |
| 2014/0091768 A1* | 4/2014 | Osswald | H02J 7/0031 | 320/134 |
| 2014/0239896 A1* | 8/2014 | Takeshita | H02J 7/00306 | 320/117 |
| 2017/0194670 A1* | 7/2017 | Kawano | H01M 50/204 | |
| 2021/0336445 A1* | 10/2021 | Oner | H02J 7/007 | |
| 2022/0026503 A1* | 1/2022 | Friese | H02J 7/0031 | |
| 2022/0029432 A1* | 1/2022 | Klee | H02J 7/0029 | |
| 2022/0029433 A1* | 1/2022 | Osswald | G01K 3/14 | |
| 2022/0029436 A1* | 1/2022 | Osswald | H02J 7/0047 | |
| 2022/0029437 A1* | 1/2022 | Osswald | H01M 10/486 | |
| 2022/0052542 A1* | 2/2022 | Haldar | H02J 7/0042 | |
| 2022/0376489 A1* | 11/2022 | Kim | H02J 7/0031 | |

FOREIGN PATENT DOCUMENTS

| | | | |
|---|---|---|---|
| JP | 2008067522 A | * | 3/2008 |
| WO | 2020/043386 A1 | | 3/2020 |

* cited by examiner

METHOD FOR CONTROLLING A CHARGING OR DISCHARGING CURRENT OF A REMOVABLE BATTERY PACK AND/OR AN ELECTRICAL DEVICE AND SYSTEM FOR CARRYING OUT THE METHOD

This application claims priority under 35 U.S.C. § 119 to patent application no. DE 10 2020 209 400.4, filed on Jul. 24, 2020 in Germany, the disclosure of which is incorporated herein by reference in its entirety.

The disclosure relates to a method for controlling a charging or discharging current of a removable battery pack and/or an electrical device, in particular a charging device, a diagnostic device or an electrical consumer, by means of a first monitoring unit integrated in the removable battery pack and a further monitoring unit integrated in the electrical device. The disclosure further relates to a system for carrying out the method.

BACKGROUND

A multiplicity of electrical consumers are operated using battery packs that can be removed without tools by the operator—referred to as removable battery packs in the following text and that are discharged accordingly by the electrical consumer and can be recharged again by means of a charging device. Such removable battery packs usually consist of a plurality of energy storage cells interconnected in series and/or in parallel for achieving a requested removable battery pack voltage or capacity. If the energy storage cells are designed as lithium-ion cells (Li-ion), for example, a high power and energy density can particularly advantageously be achieved. On the other hand, to prevent electrical fault states, such cells also require compliance with strict specifications regarding the maximum charging and discharging current, the voltage and the temperature.

In modern removable battery packs, the cell voltage of the parallel-connected energy storage cells of what is known as a cell cluster is evaluated, for example, by a monitoring unit integrated in the removable battery pack. The term "cell voltage" should accordingly be understood not only as the voltage of an individual energy storage cell but also that of a cell cluster consisting of parallel-interconnected energy storage cells. So-called single cell monitoring (SCM) of this type is known, for example, from WO 20043386 A1, in which dangerous operation of the removable battery pack in the event of a fault is also precluded by redundant monitoring.

In order for a charging device or an electrical consumer to know with which charging or discharging current a removable battery pack may be operated at a maximum, this is generally communicated by electrical coding, for example by coding resistors integrated in the removable battery pack that are measured by the electrical device and compared with a stored table, mechanical coding or a communication interface. DE 10 2016 209 822 A1 likewise discloses that the electrical device communicates to the removable battery pack that it may not continue to be used. The cell voltages can also be transmitted to the device via such an interface.

Proceeding from the prior art, it is the object of the disclosure to control the charging or discharging process via the removable battery pack without this being able to be influenced by the electrical device.

SUMMARY

According to the disclosure, provision is made for a defined control potential of a signal or data contact between the removable battery pack and the electrical device to be monitored by means of an evaluation unit, preferably a comparator, of the electrical device, wherein the control potential can be changed by the first monitoring unit of the removable battery pack when said monitoring unit has identified a fault state. In this way, it is possible for the removable battery pack to be able to interrupt a charging or discharging process without this being able to be influenced by the electrical device. In a particularly advantageous manner, the removable battery pack can thus also be protected from damage in the event of any fault in the electrical device.

In the context of the disclosure, electrical consumers should be understood to mean, for example, power tools operated using a removable battery pack for performing work on workpieces by means of an electrically driven insert tool. The power tool may in this case be realized both as a hand-held power tool and as a floor-standing power tool. Typical power tools in this context are hand-held or floor-standing drills, screwdrivers, impact drills, hammer drills, planers, angle grinders, orbital sanders, polishing machines, circular, bench, miter and jig saws or the like. However, gardening appliances operated using a removable battery pack such as lawn mowers, lawn trimmers, pruning saws or the like and also domestic appliances operated using a removable battery pack such as vacuum cleaners, mixers, etc., may also be considered as electrical consumers. The disclosure can likewise be applied to electrical consumers that are supplied with power using a plurality of removable battery packs at the same time.

The voltage of a removable battery pack is generally a multiple of the voltage of an individual energy storage cell and results from the interconnection (in parallel or in series) of the individual energy storage cells. An energy storage cell is typically designed as a galvanic cell, which has a structure in which one cell pole comes to lie at one end and a further cell pole comes to lie at an opposite end. In particular, the energy storage cell at one end has a positive cell pole and at an opposite end a negative cell pole. The energy storage cells are preferably designed as lithium-based energy storage cells, for example Li-ion, Li—Po, Li-metal or the like. However, the disclosure can also be applied to removable battery packs with Ni—Cd, Ni-MH cells or other suitable cell types. In current Li-ion energy storage cells with a cell voltage of 3.6 V, for example voltage classes of 3.6 V, 7.2 V, 10.8 V, 14.4 V, 18 V, 36 V etc. are produced. An energy storage cell is preferably designed as an at least substantially cylindrical round cell, wherein the cell poles are arranged at ends of the cylinder shape. However, the disclosure is not dependent on the type and construction of the energy storage cells used but can applied to any removable battery packs and energy storage cells, for example also pouch cells or the like in addition to round cells.

It should furthermore be noted that the configuration of the electromechanical interfaces of the removable battery packs and the electrical devices that can be connected thereto and also the associated receptacles for force-fitting and/or form-fitting releasable connection are not intended to be the subject of this disclosure. A person skilled in the art will select a suitable embodiment for the interface depending on the power or voltage class of the electrical device and/or the removable battery pack. The embodiments shown in the drawings are therefore to be understood as purely exemplary. It is thus possible, in particular, to also use interfaces having more than the illustrated electrical contacts.

In another configuration of the disclosure, provision is made for the defined control potential to be formed from at least one first resistor in the removable battery pack and at least one further resistor in the electrical device between a first reference potential, preferably a supply potential or a reference potential in the electrical device, and a second reference potential, preferably a ground potential, different from the first reference potential, in the removable battery pack. If the first monitoring unit of the removable battery pack identifies a fault state, it can change the defined control potential in the direction of the second reference potential, preferably by more than 0.1 V, by bypassing the at least one first resistor. An output signal of the evaluation unit is then set, preferably to a LOW level. The output signal of the evaluation unit is linked with an output signal of a further monitoring unit of the electrical device by means of a logic link element, in particular an AND element, to form a control signal for a switching element in such a way that the charging or discharging process can be interrupted or established thereby. This has the advantage that no switching element has to be installed in the removable battery pack to interrupt the charging or discharging current, which is able to carry the significantly higher discharging currents in addition to the charging currents. Furthermore, it is also possible to adapt the switching element to the respective electrical device, since a switching element used in a charging device can be dimensioned to be smaller than a switching element in an electrical consumer due to the significantly lower charging currents compared to the discharging currents.

In addition, provision is made for the further monitoring unit to detect a change in the defined control potential at the signal or data contact and/or the output signal of the evaluation unit and to log and/or signal the detected fault state. The further monitoring unit of the electrical device thus receives knowledge about whether the charging or discharging process of the removable battery pack has been interrupted. This can also be displayed to the operator accordingly.

In order to save further components for detecting the change in the defined control potential at the signal or data contact and/or the output signal of the evaluation unit, the further monitoring unit, in an alternative configuration, can continuously monitor the charging or discharging current in the electrical device and, in conjunction with the first monitoring unit of the removable battery pack, log and/or signal a sudden drop of the charging or discharging current.

The disclosure also relates to a system comprising a removable battery pack having a first electromechanical interface having a plurality of electrical contacts, and an electrical device, in particular a charging device, a diagnostic device or an electrical consumer, having a further electromechanical interface having a plurality of electrical contacts, wherein in each case a first of the electrical contacts of the interfaces is designed as an energy supply contact that can be supplied with a first reference potential, preferably a supply potential, in each case a second of the electrical contacts of the interfaces is designed as an energy supply contact that can be supplied with a second reference potential, preferably a ground potential, and in each case at least a third of the electrical contacts of the interfaces is designed as a signal or data contact. The electrical contacts of the first and the further interface can be connected to one another in order to carry out the method according to the disclosure. This and the following apparatus features result in the advantages already described for the method according to the disclosure.

The first energy supply contact and the signal or data contact of the further interface of the electrical device and the second energy supply contact and the signal or data contact of the first interface of the removable battery pack are thus each connected to one another via at least one resistor in such a way that the resistors, in the connected state of the interfaces, have a voltage divider with a defined control potential at the signal or data contacts between the first and the second reference potential. The removable battery pack has a further switching element, in particular a transistor or a relay, which can be controlled by the first monitoring unit of the removable battery pack in such a way that, in the closed state, said switching element connects in each case the second energy supply contacts and the signal or data contacts of the interfaces to one another. The defined control potential at the signal or data contacts has a value of greater than 0.1 V, preferably greater than 0.5 V, when the further switching element of the removable battery pack is open.

The electrical device has a switching element, in particular a transistor or a relay, connected to the first energy supply contact or the second energy supply contact of the further interface for influencing a charging or discharging current. Furthermore, the electrical device has an evaluation unit connected to the signal or data contact of the further interface, in particular a comparator, wherein an output of the evaluation unit and an output of a further monitoring unit of the electrical device supply a control signal for controlling the switching element by means of a logic link element, in particular an AND element.

In addition, provision can be made for the output of the evaluation unit and/or the signal or data contact of the further interface to each be connected to the further monitoring unit of the electrical device via a filter element, in particular a diode. The further monitoring unit of the electrical device thus receives knowledge about whether the charging or discharging process of the removable battery pack has been interrupted. In order to save, in particular, the filter element and possibly further components, as an alternative provision can also be made for the first monitoring unit of the removable battery pack and the further monitoring unit of the electrical device to be able to be connected to one another via a respective fourth electrical contact, designed as a signal or data contact, of the interfaces, wherein the further monitoring unit continuously monitors the charging or discharging current at the energy supply contacts and, in conjunction with the first monitoring unit of the removable battery pack, logs and/or signals an abrupt drop in the charging or discharging current.

BRIEF DESCRIPTION OF THE DRAWINGS

The disclosure is explained by way of example in the following text based on FIGS. 1 and 2, wherein identical reference signs in the figures indicate identical component parts with an identical function.

In the drawings.

DETAILED DESCRIPTION

Figure 1:
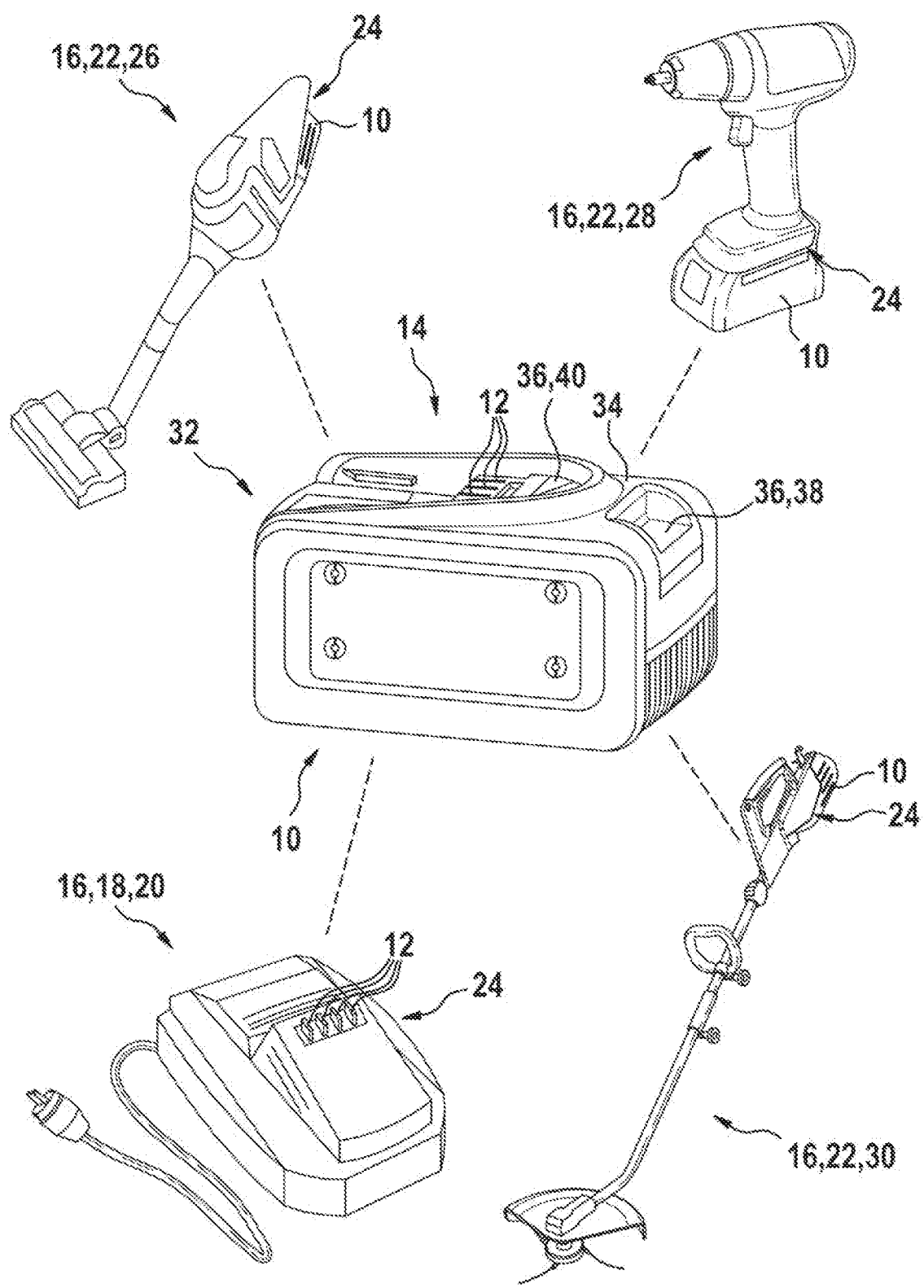
FIG. 1: shows a schematic illustration of a system comprising at least one removable battery pack and at least one electrical device that can be connected to the removable battery pack for charging or discharging the removable battery pack.

FIG. 1 shows a system comprising a removable battery pack 10 having a first electromechanical interface 14 having a plurality of electrical contacts 12, and an electrical device 16, in particular a charging device 18, a diagnostic device 20 or an electrical consumer 22, having a further electromechanical interface 24 having a plurality of electrical contacts 12. FIG. 1 is intended to illustrate that the system according to the disclosure is suitable for various electrical devices 16 operated using removable battery packs 10 without restricting the disclosure. In this case, a cordless vacuum cleaner 26, a cordless impact wrench 28 and a cordless lawn trimmer 30 are shown by way of example. In the context of the disclosure, however, a wide variety of power tools, gardening appliances and domestic appliances can be considered as electrical consumers 22. The number of removable battery packs 10 within the system can also be changed. The system can indeed also comprise a plurality of removable battery packs 10. It should furthermore be noted that, although in FIG. 1 the charging device 18 and the diagnostic device 20 are illustrated as one and the same electric device 16 because a charging device 18 can indeed also have a diagnostic function, it is conceivable, without restricting the disclosure, that the diagnostic device 20 does not have a charging function but serves only for pure diagnostics of the removable battery pack 10 for electrical fault states.

The removable battery pack 10 is essentially a conventional removable battery pack having a housing 32, which has, on a first side wall or the top side 34 thereof, the first electromechanical interface 14 for releasable connection to the electromechanical interface 24 of the electrical device 16. In connection with the electrical consumer 22, the first and the further electromechanical interface 14, 24 primarily serve to discharge the removable battery pack 10 while, in connection with the charging device 18, they serve to charge and, in connection with the diagnostic device 20, they serve for fault diagnosis of the removable battery pack 10. The precise configuration of the first and the further electromechanical interface 14, 24 is dependent on different factors, such as the voltage class of the removable battery pack 10 or the electrical device 16 and various manufacturer specifications, for example. It is thus possible to provide, for example, three or more electrical contacts 12 for energy and/or data transmission between the removable battery pack 10 and the electrical device 16. Mechanical coding is also conceivable, such that the removable battery pack 10 can be operated only at specific electrical devices 16. Since the mechanical configuration of the first electromechanical interface 14 of the removable battery pack and the further electromechanical interface 24 of the electrical device 16 is insignificant for the disclosure, this will not be dealt with in more detail here. Both a person skilled in the art and an operator of the removable battery pack 14 and the electrical device 16 will make the suitable selection in this regard.

The removable battery pack 10 has a mechanical arresting apparatus 36 for arresting the form-fitting and/or force-fitting releasable connection of the first electromechanical interface 14 of the removable battery pack 10 at the corresponding mating interface 24 (not shown in detail) of the electrical consumer 22. In this case, the arresting apparatus 36 is designed as a sprung pushbutton 38, which is operatively connected to an arresting member 40 of the removable battery pack 10. Due to the suspension of the pushbutton 38 and/or the arresting member 40, the arresting apparatus 36 automatically latches into the mating interface 24 of the electrical consumer 22 when the removable battery pack 10 is inserted. If an operator presses the pushbutton 38 in the insertion direction, the arresting system is released and the operator can remove or eject the removable battery pack 10 from the electrical consumer 22 counter to the insertion direction.

As already mentioned at the beginning, the battery voltage of the removable battery pack 10 usually results from a multiple of the individual voltages of the energy storage cells (not shown) depending on their interconnection (in parallel or in series). The energy storage cells are preferably designed as lithium-based battery cells, for example Li-ion, Li—Po, Li-metal or the like. However, the disclosure can also be applied to removable battery packs with Ni—Cd, Ni-MH cells or other suitable cell types.

Figure 2:
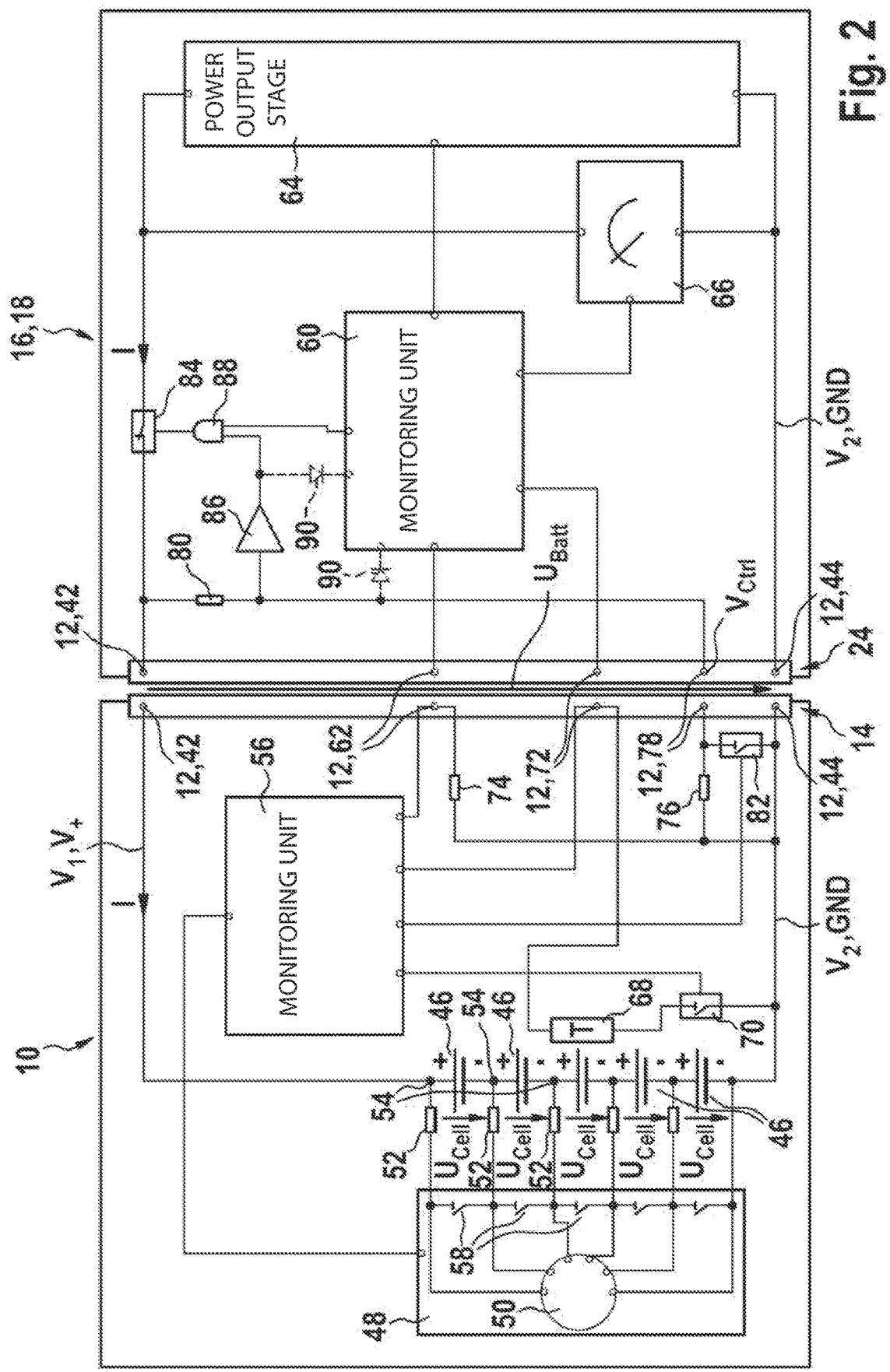
FIG. 2: shows the system from FIG. 1 as a block diagram with a removable battery pack and an electrical device designed as a charging device.

In FIG. 2, the system from FIG. 1 is illustrated in a block diagram with the removal battery pack 10 on the left-hand side and the electrical device 16 designed as a charging device 18 on the right-hand side. The removable battery pack 10 and the charging device 18 have the mutually corresponding electromechanical interfaces 14 and 24 having a plurality of electrical contacts 12, wherein in each case a first of the electrical contacts 12 of the interfaces 14, 24 serves as an energy supply contact 42 that can be supplied with a first reference potential $V_1$, preferably a supply potential $V_+$, and in each case a second of the electrical contacts 12 of the interfaces 14, 24 serves as an energy supply contact 44 that can be supplied with a second reference potential $V_2$, preferably a ground potential GND. On the one hand, the removable battery pack 10 can be charged by the charging device 18 via the first and the second energy supply contact 42, 44. On the other hand, discharge of the removable battery pack 10 is also effected via the same for the case that the electrical device 16 is designed as an electrical consumer 22. The term "can be supplied with" is intended to illustrate that the potentials $V_+$ and GND, in particular in the case of an electrical device 16 designed as an electrical consumer 22, are not permanently applied to the energy supply contacts 42, 44 but only after connection of the electrical interfaces 14, 24. The same applies for a discharged removable battery pack 10 after connection to the charging device 18.

The removable battery pack 10 has a plurality of energy storage cells 46, which, although they are illustrated in FIG. 2 as a series circuit, can alternatively or additionally also be operated in a parallel circuit, wherein the series circuit defines the voltage $U_{Batt}$ of the removable battery pack dropped across the energy supply contacts 42, 44, whereas a parallel circuit of individual energy storage cells 46 primarily increases the capacity of the removable battery pack 10. As already mentioned, individual cell clusters consisting of parallel-interconnected energy storage cells 46 can also be connected in series in order to achieve a specific voltage $U_{Batt}$ of the removable battery pack at the same time as an increased capacity. In current Li-ion energy storage cells 46 with a cell voltage $U_{Cell}$ of in each case 3.6 V, in the present exemplary embodiment a removable battery pack voltage $U_{Batt}=V_1-V_2$ of 5·3.6 V=18 V drops across the energy supply contacts 42, 44. Depending on the number of energy storage cells 46 connected in parallel in a cell cluster, the capacity of current removable battery packs 10 can be up to 12 Ah or more. However, the disclosure is not dependent on the type, construction, voltage, current-carrying ability, etc. of the energy storage cells 46 used, but instead can be applied to any removable battery packs 10 and energy storage cells 46.

To monitor the individual series-connected energy storage cells 46 or cell clusters of the removable battery pack 10, an SCM (single cell monitoring) preliminary stage 48 is provided. The SCM preliminary stage 48 has a multiplexer measuring apparatus 50, which can be connected in a high-impedance manner to corresponding taps 54 of the poles of the energy storage cells 46 or cell clusters via filter resistors 52. To detect the individual cell voltages $U_{Cell}$, the multiplexer measuring apparatus 50 switches over sequentially between the individual taps 54, for example by means of integrated transistors, which are not shown in more detail, in such a way that it is connected in each case to a positive and a negative pole of the energy storage cell 46 to be measured or the cell cluster to be measured. In the following text, the term energy storage cell is also intended to include the cell cluster, since these only influence the capacity of the removable battery pack 10, but are synonymous for detecting the cell voltages $U_{Cell}$. The filter resistors 52, which are configured, in particular, in a high-impedance manner, can prevent dangerous heating of the measuring inputs of the multiplexer measuring apparatus 50, in particular in the event of a fault.

The switchover of the multiplexer measuring apparatus 50 is effected by means of a first monitoring unit 56 integrated in the removable battery pack 10. Said monitoring unit can additionally close or open switching elements 58 of the SCM preliminary stage 48 that are connected in parallel with the energy storage cells 46 in order in this way to effect what is known as balancing of the energy storage cells 46 to achieve uniform charging and discharging states of the individual energy storage cells 46. It is likewise conceivable that the SCM preliminary stage 48 passes the measured cell voltages $U_{cell}$ directly through to the first monitoring unit 56 such that the actual measurement of the cell voltages $U_{cell}$ is carried out directly by the first monitoring unit 56, for example by means of an appropriate analog-to-digital converter (ADC).

The first monitoring unit 56 can be designed as an integrated circuit in the form of a microprocessor, ASIC, DSP or the like. However, it is likewise conceivable that the monitoring unit 56 consists of a plurality of microprocessors or at least partly of discrete components with appropriate transistor logic. In addition, the first monitoring unit 56 can have a memory for storing operating parameters of the removable battery pack 10, such as, for example, the voltage $U_{Batt}$, the cell voltages $U_{Cell}$, a temperature T, a charging or discharging current I or the like.

In addition to the first monitoring unit 56 in the removable battery pack 10, the electrical device 16 of the system has a further monitoring unit 60, which can be designed correspondingly to the first monitoring unit 56. The first and the further monitoring unit 56 and 60, respectively, can exchange information, preferably digitally, via a third contact 12, designed as a signal or data contact 62, of the two electromechanical interfaces 14, 24.

The further monitoring unit 60 of the electrical device 16 designed as a charging device 18 controls a power output stage 64, which is connected to the first and the second energy supply contact 42, 44 of the further interface 24 and by means of which the removable battery pack 10 plugged into the charging device 18 can be charged using the charging current I and the voltage $U_{Batt}$ corresponding to the removable battery pack 10. For this purpose, the charging device 18 or the power output stage 64 is provided with a mains connection, which is not shown. The voltage $U_{Batt}$ applied to the energy supply contacts 42, 44 can be measured by means of a voltage measuring apparatus 66 in the charging device 18 and evaluated by the further monitoring unit 60. The voltage measuring apparatus 66 can also be integrated fully or partly in the monitoring unit 60, for example in the form of an integrated ADC.

A temperature T of the removable battery pack 10 or the energy storage cells 46 can be measured by means of a temperature sensor 68, which is arranged in the removable battery pack 10 and preferably designed as an NTC and in close thermal contact with at least one of the energy storage cells 46, and evaluated by the further monitoring unit 60 of the charging device 18. To this end, the temperature sensor 68 is connected on the one hand to the second reference potential $V_2$, in particular to the ground potential GND, which is applied to the second energy supply contact 44 via a switching element 70, for example a bipolar transistor or MOSFET, which is integrated in the removable battery pack 10, and on the other hand to a contact 12, designed as a signal or data contact 72, of the first interface 14 of the removable battery pack 10. A signal or data contact 72 is accordingly provided in the further interface 24 of the charging device 18, said contact being connected to the further monitoring unit 60. Furthermore, a connection exists between the signal or data contact 72 of the first interface 14 of the removable battery pack 10 and the first monitoring unit 56 of the removable battery pack 10. Via said connection, the first monitoring unit 56 can determine whether the temperature T measured by the temperature sensor 68 has been requested by the further monitoring unit 60 of the charging device 18. If this is the case, the first monitoring unit 56 is transferred automatically from a quiescent mode to an operating mode. If there has been no such request, the quiescent mode allows the first monitoring unit 56 significantly longer idle and storage times of the removal battery pack 10 due to the reduced quiescent current.

In order that the charging device 18 can identify the removable battery pack 10 and, if necessary, enable it for charging, the removable battery pack 10 has a first coding resistor 74, which is connected on one side to the second reference potential $V_2$, in particular to the ground potential GND, which is applied to the second energy supply contact 44, and on the other side to the third contact 12, designed as a signal or data contact 62, of the first interface 14 of the removable battery pack 10. If the resistance value of the first coding resistor 74 corresponds to a value stored in the further monitoring unit 56 of the charging device 60, the charging device 18 enables the charging process and charges the removable battery pack 10 according to the charging parameters stored in a look-up table, in particular the charging current I, the charging voltage $U_{Batt}$, the permissible temperature range, etc. In addition to the first coding resistor 74, a second coding resistor 76 is provided in the removable battery pack 10, said second coding resistor being connected, in a manner corresponding to the first coding resistor 74, to the second reference potential $V_2$ and a further contact 12, designed as a signal or data contact 78, of the first interface 14 of the removable battery pack 10. An electrical device 16 designed as an electrical consumer 22 can enable the discharge process of the removable battery pack 10 by means of the second coding resistor 76. To this end, analogously to the charging device 18, the electrical consumer 22 has a further monitoring unit 60, which requests the resistance value of the second coding resistor 76 by means of a contact 12, designed as a signal or data contact 78, of the further interface 24 and compares it with a stored value. If the values do not correspond, the discharging process of the removable battery pack 10 is terminated or not permitted, with the result that the electrical consumer 22 cannot be set into operation. When they correspond, an operator can set the electrical consumer 22 into operation. This advantageously allows operation of removable battery packs 10 of different power classes with identical electromechanical interfaces 14 or 24. It is self-evident that, in the case of an electrical consumer 22, the power output stage 64 contained in the charging device 18 is designed as a drive unit, for example as an electric motor (possibly with power output stage accordingly connected upstream) or another unit that consumes energy. The configuration of such a unit will not be dealt with further here since it is well known to a person skilled in the art for a wide variety of types of electrical consumers 22 and also as such does not have any critical importance for the disclosure.

The second coding resistor 76 can now also be used in such a way that, in conjunction with a further resistor 80, in particular a pull-up resistor, in the charging device 18, it generates a defined control potential $V_{Ctrl}$ at the further contact 12, designed as a signal or data contact 78, of the interfaces 14, 24. For this purpose, the further resistor 80 of the charging device 18 is connected on the one hand to the signal or data contact 78 of the interface 24 and on the other hand to the first reference potential $V_1$, in particular the supply potential $V_+$, applied to the first energy supply contact 42 of the interface 24. As soon as the two interfaces 14, 24 of the removable battery pack 10 and of the charging device 18 are connected to one another, the two resistors 76, 80 form a voltage divider between the first and the second reference potential $V_1$, $V_2$ with the resulting control potential $$V_{Ctrl}=(1+R_{80}/R_{76})*(V_1-V_2)=(1+R_{80}/R_{76})*V,$$

where $R_{80}$ and $R_{76}$ define the resistance values of the two resistors 76 and 80. As an alternative, it is also conceivable that, instead of the first reference potential $V_1$ or the supply potential $V_+$, a reference potential $V_{Ref}$ different from the second reference potential $V_2$ is used to form the control potential $V_{Ctrl}$. Instead of the resistors 76, 80, other electronic components with a defined resistance value, such as, for example, diodes or other semiconductors, can also be used. It is likewise conceivable that the voltage divider is only formed in the charging device 18.

The removable battery pack 10 also has a further switching element 82, in particular a transistor or a relay, which can be controlled by the first monitoring unit 56 of the removable battery pack 10 in such a way that, in the closed state, said switching element bypasses the second coding resistor 76 and therefore connects the signal or data contacts 78 of the interfaces 14, 24 to the second energy supply contact 44. Therefore, the defined control potential $V_{Ctrl}$ at the contacts 12, designed as a signal or data contact 78, of the interfaces 14, 24 has a value of greater than 0.1 V, preferably greater than 0.5 V, when the further switching element 82 of the removable battery pack 10 is open, while $V_{Ctrl}$ has a value close to the second reference potential $V_2$, preferably the ground potential GND, when the further switching element 82 is closed.

A switching element 84, in particular a transistor or a relay, connected to the first energy supply contact 42 of the further interface 24 is provided in the charging device 18 for influencing the charging current I. This means that the charging process can be interrupted or established if required. The switching element 84 can now be controlled on the one hand via an evaluation unit 86, in particular a comparator, which compares $V_{Ctrl}$ with the reference potential $V_{Ref}$ and is connected to a node located between the further resistor 80 and the signal or data contact 78, and on the other hand via the further monitoring unit 60 of the charging device 18. To this end, an output of the evaluation unit 86 and an output of the further monitoring unit 60 form a corresponding switching signal by means of a logic link element 88, in particular an AND element. However, depending on the output signal, alternative logic links, such as, for example, OR, EXCLUSIVE OR, etc., can also be considered. In the case of an AND link, the switching element 84 is only closed when both the output signal of the evaluation unit 86 and that of the further monitoring unit 60 supply a HIGH level or a logic 1. As soon as one of these output signals has a LOW level or a logic 0, the switching element 84 is opened in order to interrupt the charging process. In addition, it should be mentioned that the switching element 84 for influencing the charging current I can alternatively also be connected to the second energy supply contact 44 of the further interface 24. It is likewise conceivable to provide a switching element 84 in both current paths.

The evaluation unit 86 now observes the control potential $V_{Ctrl}$ at the signal or data contact 78, which has a value of more than 0.1 V, preferably more than 0.5 V, in the fault-free state, that is to say when the further switching element 82 of the removable battery pack 10 is open. If the first monitoring unit 56 of the removable battery pack 10 now detects a fault state because, for example, the measured temperature T, the charging current I, the voltage $U_{Batt}$, one of the cell voltages $U_{Cell}$, the remaining capacity or the like lie outside their limit values required for a permissible operating range, then the first monitoring unit 56 closes the further switching element 82 and thus draws the control potential $V_{Ctrl}$ in the direction of the second reference potential $V_2$ or the ground potential GND. This is identified by the evaluation unit 86 of the charging device 18, which in turn falls to a LOW level and thus prevents the further closing of the switching element 84 despite the opposite switching signal from the further monitoring unit 60, with the result that the charging process is terminated.

In addition, provision can be made for the output of the evaluation unit 86 and/or the signal or data contact 78 of the further interface 24 to each be connected to the further monitoring unit 60 of the charging device 18 via a filter element 90, in particular a diode. These additional options are illustrated in FIG. 2 using dashes. The further monitoring unit 60 of the charging device 18 can thus also detect the control potential $V_{Ctrl}$ or the output signal of the evaluation unit 86 for the purpose of logging and/or display for an operator. To signal this information, the charging device 18 and/or the removable battery pack 10 have a corresponding display, not shown in more detail, in the form of LEDs, a display screen and/or an acoustic signal generator. If the electrical device 18 is designed as a diagnostic device 20 or an electrical consumer 22, the display can additionally or alternatively also be designed as a haptic signal generator, for example in the form of a vibration motor. In the case of an electrical consumer 22 driven by electric motor, it is also conceivable that a drive motor for an insert tool serves as haptic and/or acoustic signal generator.

Furthermore, provision can be made for the further monitoring unit 60 to continuously monitor the charging current I at the energy supply contacts 42, 44 and, in conjunction with the first monitoring unit 56 of the removable battery packs 10, to log and/or signal an interruption in the flow of current. If the further monitoring unit 60 of the charging device 18 detects an abrupt drop in the charging current I when the removable battery pack 18 is connected, then a disruption of the charging process not initiated thereby has taken place. In this way, it is possible to determine whether the charging process has been suppressed by the removable battery pack 10 without additional components in the removable battery pack 10 and in the charging device 18.

Finally, it should be pointed out that the exemplary embodiments shown are not restricted either to FIGS. 1 and 2 nor to the number and type of removable battery packs 10 and electrical devices 16 shown therein. The same applies to the number of energy storage cells 46 and the associated configuration of the multiplexer measuring apparatus 48. The configurations of the interfaces 14, 24 and the number of contacts 12 thereof shown should be understood as purely exemplary.

What is claimed is:

1. A method for controlling (i) a charging current supplied to a removable battery pack, or (ii) a discharging current from the removable battery pack using a first monitoring unit integrated in the removable battery pack, the method comprising:
monitoring a defined control potential of a signal or data contact between the removable battery pack and an electrical device using an evaluation unit of the electrical device, the removable battery pack operably connected to the electrical device;
changing the defined control potential using the first monitoring unit when the first monitoring unit has identified a fault state of the removable battery pack;
signaling the identified fault state by changing a display of the removable battery pack;
forming the defined control potential from (i) at least one first resistor in the removable battery pack at a first reference potential, and (ii) at least one further resistor in the electrical device at a second reference potential different from the first reference potential, wherein changing the defined control potential comprises changing the defined control potential in the removable battery pack in a direction of the second reference potential by bypassing the at least one first resistor when the first monitoring unit has identified the fault state of the removable battery pack;
setting an output signal of the evaluation unit to a LOW level when the defined control potential has changed in the direction of the second reference potential;
supplying the output signal of the evaluation unit and an output signal of a second monitoring unit of the electrical device to a logic link element, wherein an output of the logic link element is a control signal for a switching element;
using the switching element to interrupt or establish the charging current or the discharging current based on the output of the logic link element;
connecting the output signal of the evaluation unit to the second monitoring unit with a first filter element;
connecting an input of the evaluation unit to the second monitoring unit with a second filter element, wherein the input of the evaluation unit is the defined control potential;
detecting the change in the defined control potential using the second monitoring unit; and
logging the identified fault state using the second monitoring unit.

2. The method according to claim 1, further comprising:
continuously monitoring the charging current or the discharging current using the second monitoring unit; and
signaling a sudden drop of the charging current or the discharging current using the second monitoring unit by causing the first monitoring unit to change the display of the removable battery pack.

3. A system comprising:
a removable battery pack including a first monitoring unit and a first electromechanical interface having a first plurality of electrical contacts; and
an electrical device including:
an evaluation unit,
a second electromechanical interface having a second plurality of electrical contacts,
a second monitoring unit,
a logic link element configured to receive an output signal of the evaluation unit and an output signal of the second monitoring unit,
a switching element configured to receive an output of the logic link element,
a first filter element configured to connect the output signal of the evaluation unit to the second monitoring unit, and
a second filter element configured to connect an input of the evaluation unit to the second monitoring unit,
wherein in each of the first and second plurality of electrical contacts (i) a first electrical contact is configured as an energy supply contact supplied with a first reference potential, (ii) a second electrical contact is configured as an energy supply contact supplied with a second reference potential, and (iii) a third electrical contact is configured as a signal or data contact, and
wherein the system is configured to control (i) a charging current supplied to the removable battery pack from the electrical device using the first monitoring device, or (ii) a discharging current from removable battery pack to the electrical device using the first monitoring unit, the system configured to:
monitor a defined control potential of the signal or data contact between the removable battery pack and the electrical device using the evaluation unit, the defined control potential supplied to the input of the evaluation unit,
change the defined control potential using the first monitoring unit when the first monitoring unit has identified a fault state of the rechargeable battery pack, and
interrupt or establish a charging or discharging process of the removable battery pack based on the output of the logic link element using the switching element.

4. The system according to claim 3, wherein:
(i) the energy supply contact of the first interface and the signal or data contact of the second interface of the electrical device, and (ii) the energy supply contact of the second interface and the signal or data contact of the first interface of the removable battery pack are each connected via at least one resistor, such that the at least one resistor, in a connected state of the interfaces, have a voltage divider with the defined control potential at the respective signal or data contacts between the first and the second reference potentials, and
in a closed state of the switching element, the switching element connects in each case the second energy supply contacts and the signal or data contacts of the first and second interfaces to one another.

5. The system according to claim 4, wherein the defined control potential at the signal or data contacts has a value of greater than 0.1 V when the switching element is in an open state.

6. The system according to claim 3, wherein:
the evaluation unit includes a comparator,
the comparator is connected to the signal or data contact of the second interface, an input of the comparator is connected directly to the first filter element to receive the defined control potential, and an output of the comparator is connected directly to the logic link element and the second filter element.

7. The system according to claim 6, wherein:

the first monitoring unit of the removable battery pack and the second monitoring unit of the electrical device are connected via a respective fourth electrical contact, configured as another signal or data contact, of the first and second interfaces, and the second monitoring unit is configured to continuously monitor the charging current or the discharging current at the energy supply contacts, and to log and/or signal an abrupt drop in the charging or discharging current.

* * * * *